May 29, 1956  V. C. LAFFERTY  2,748,346
APPARATUS FOR TESTING ARTICLES
Filed June 7, 1954  4 Sheets-Sheet 1

INVENTOR:
V. C. LAFFERTY
BY
C. B. Hamilton
ATTORNEY

May 29, 1956

V. C. LAFFERTY 2,748,346

APPARATUS FOR TESTING ARTICLES

Filed June 7, 1954

4 Sheets-Sheet 4

INVENTOR:
V. C. LAFFERTY
BY
C. B. Hamilton

ATTORNEY

United States Patent Office 2,748,346
Patented May 29, 1956

2,748,346

APPARATUS FOR TESTING ARTICLES

Vincent C. Lafferty, Berwyn, Ill., assignor to Western Electric Company, Incorporated, New York, N. Y., a corporation of New York Application June 7, 1954, Serial No. 434,989

10 Claims. (Cl. 324—73)

This invention relates to apparatus for testing articles, and more particularly to apparatus for effecting a series of tests of coils.

In the manufacture of electrical articles, such as, for example, relay coils, it is often desirable to test the coils before they are assembled finally with relays, and, in the past, it has been time-consuming to connect the coils to testing apparatus for testing the coils, which slows down the output of the testing apparatus.

An object of the invention is to provide new and improved apparatus for effecting a series of tests on a coil.

Another object of the invention is to provide apparatus for testing coils as quickly as the coils may be loaded and unloaded.

A further object of the invention is to provide testing apparatus which includes automatically operable loading mechanism.

In a testing apparatus illustrating certain features of the invention, there may be provided a turntable provided with two coil holders thereon and means for oscillating the turntable between a position in which a coil held by one holder in contact with a test set and a second position in which a coil held by the other holder is placed in a testing position in contact with the test set. The test set effects a series of tests on each coil as the coil is connected thereto, and, if the coil passes all the tests, actuates the oscillating mechanism to move the tested coil to its unloading position and move a coil held by the other holder into engagement with the contacts of the test set to start the tests thereon.

Figure 1:
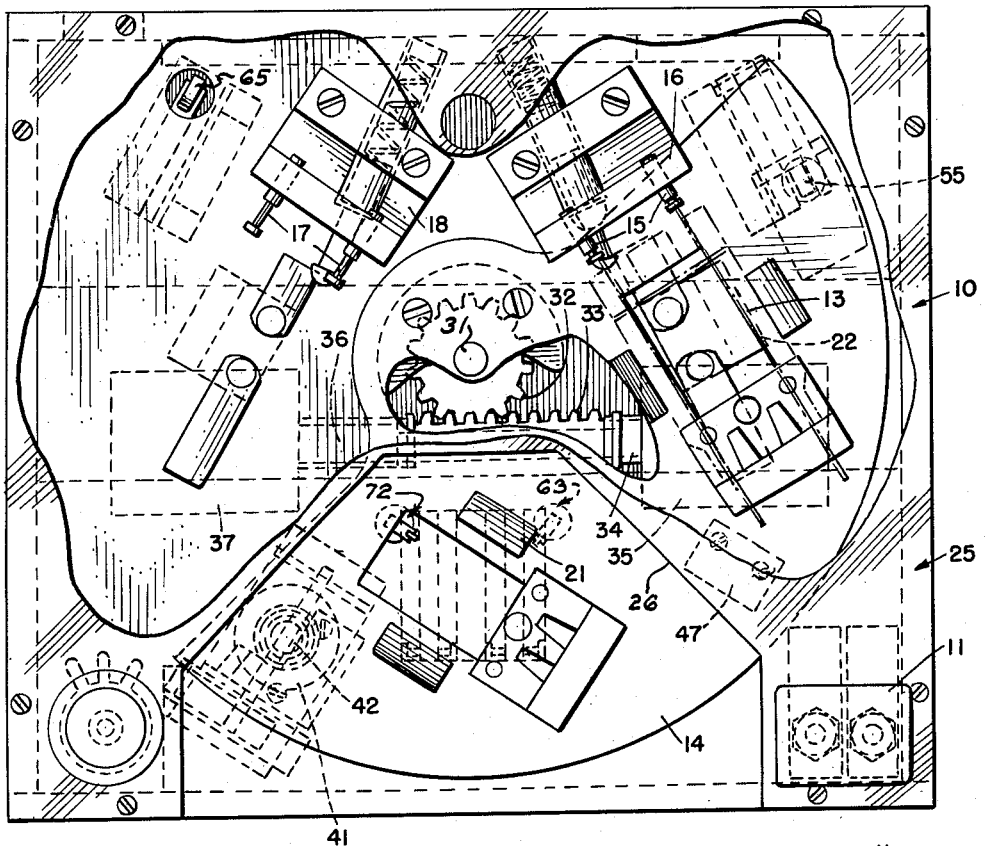
Figure 2:
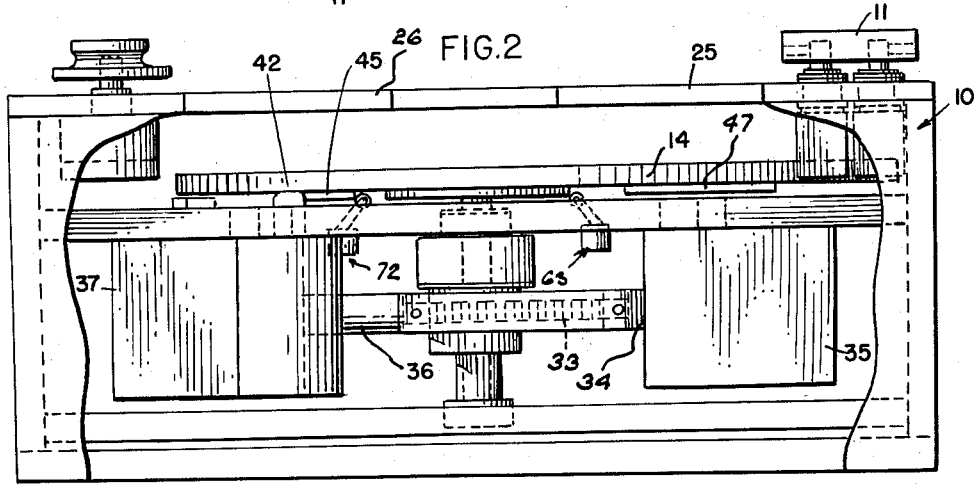
Figure 3:
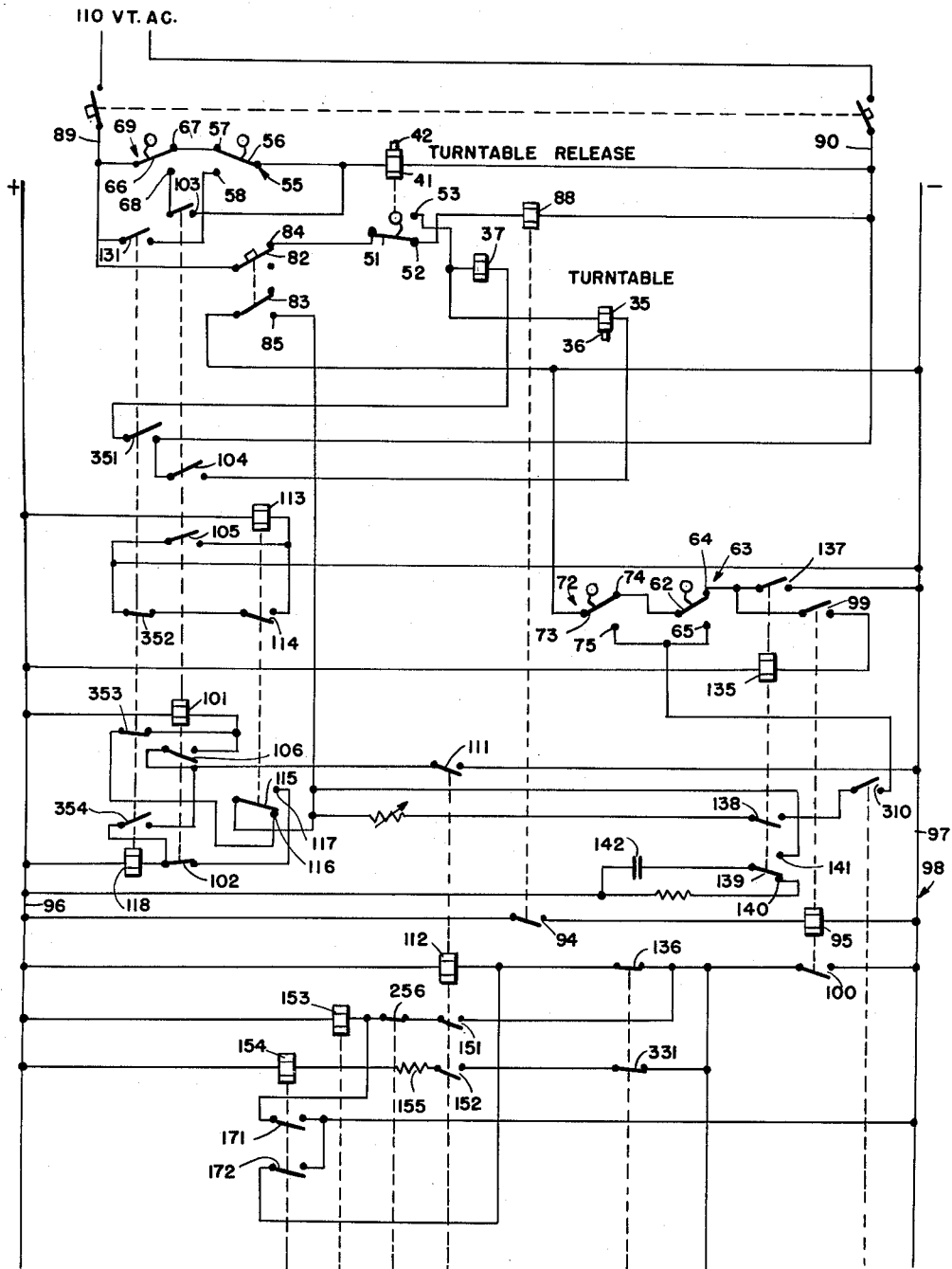
Figure 4:
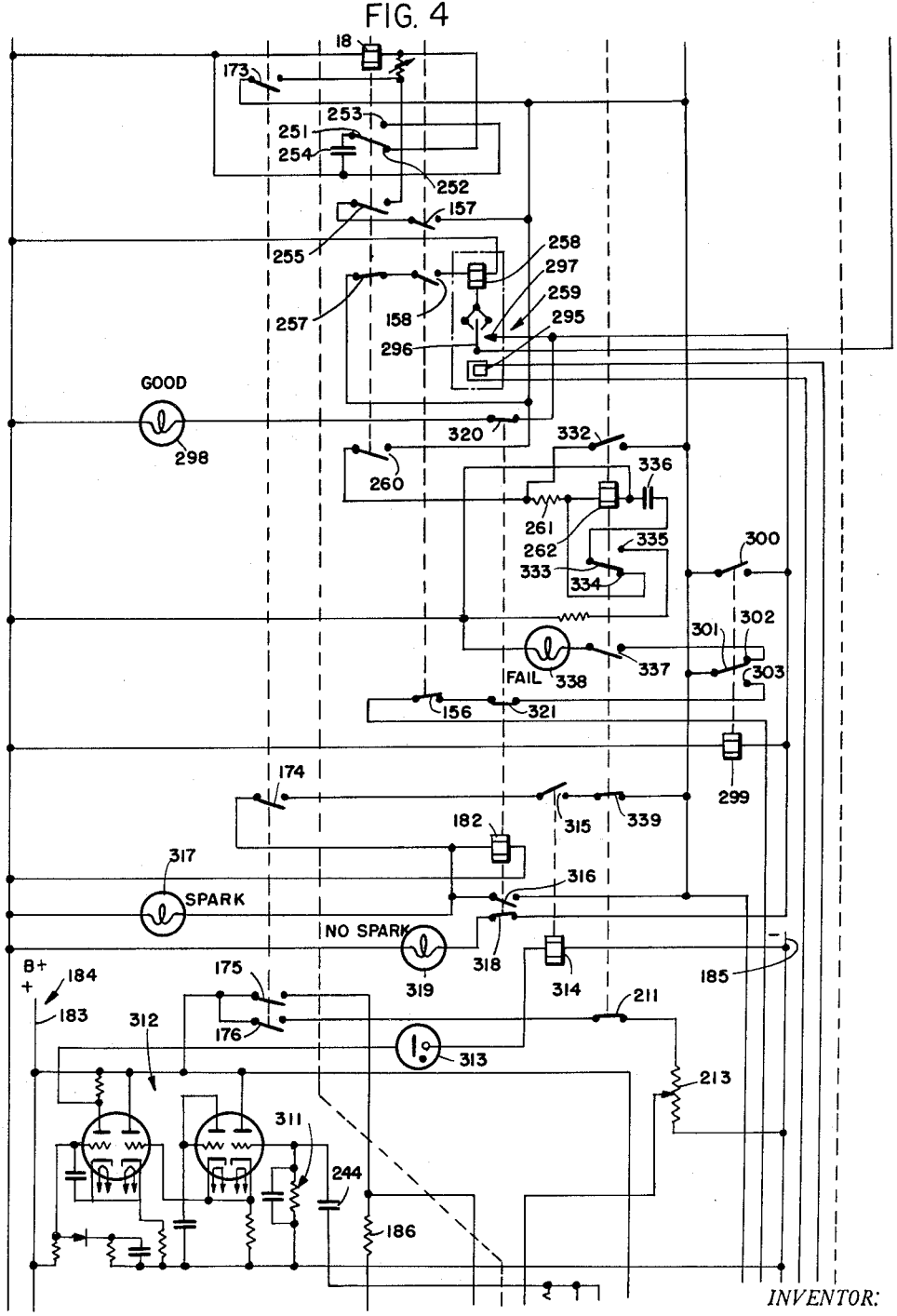
Figure 5:
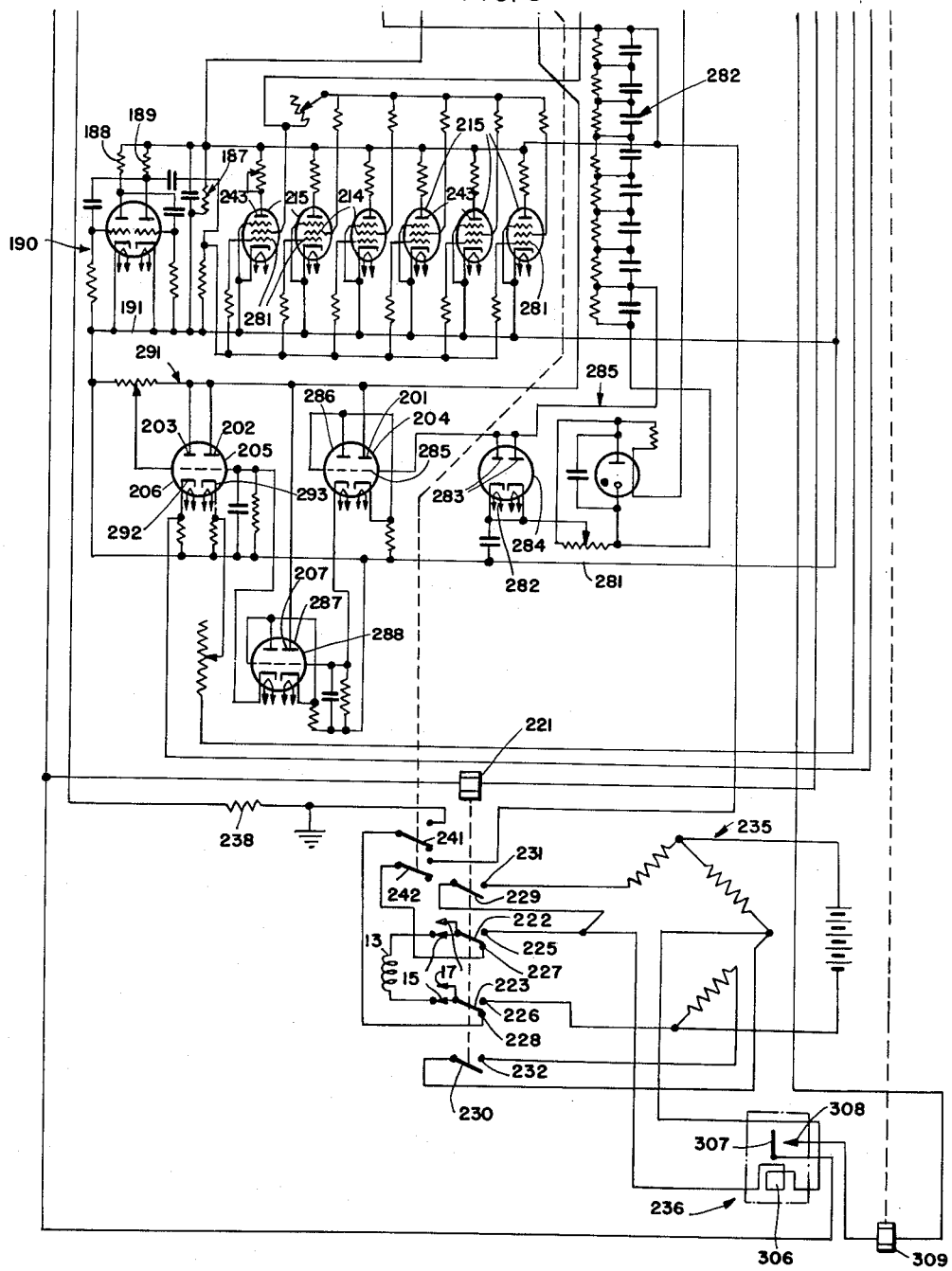

A complete understanding of the invention may be obtained from the following detailed description of an apparatus forming a specific embodiment thereof, when read in conjunction with the appended drawings, in which Fig. 1 is a top plan view of an apparatus forming one embodiment of the invention;

Fig. 2 is a front elevation of the apparatus shown in Fig. 1 with portions thereof broken away; and Figs. 3, 4 and 5 are schematic views, which may be fitted together, of a control and testing circuit used in conjunction with the apparatus shown in Figs. 1 and 2.

Referring now in detail to the drawings, there is shown therein a loading fixture 10 for a test set 11 for testing relay coils 13 when a turntable segment 14 moves half the coils alternately into engagement with spring-pressed plungers 15 of a connector block 16 connected to the test set 11 and the rest of the coils into engagement with parallel connectors 17 of a connector block 18 of the test set. The turntable 14 is provided with a holder 21 for receiving and holding one of the coils to be moved into engagement with the spring-pressed connectors 17, and also has a holder 22 for holding the coils 13 to be moved into engagement with the connectors 15. A transparent cover 25 having a loading and unloading opening 26 is provided to prevent access to any of the coils being engaged by the connectors 15 or 17.

The turntable 14 is keyed to a shaft 31 having a pinion gear 32 keyed thereto, which is engaged by a rack 33 fixed at one end to a core 34 in a solenoid winding 35 and fixed at its other end to a core 36 in a solenoid winding 37. The solenoid windings 35 and 37 are fixed and are designed to shift the rack 33 back and forth to swing the turntable 14 between its alternate position, in one of which the holder 21 presents rigid leads of the coil into engagement with the connectors 17, and the holder 22 is positioned in the opening 26 so that the coil held by the holder 22 may be removed and a new coil placed in the holder 22 and the other position in which the holder 22 holds the coil carried thereby in a position in which rigid leads thereof are engaged by the connectors 15 and the holder 21 is in its unloading and loading position at the opening 26 in the guard plate 25. A latching or release solenoid 41 has a core 42 which is designed to move behind a plate 45 to hold the turntable 14 is proper position for testing a coil at the connector block 16, and is designed to enter behind a plate 47 to latch the turntable 14 in a position in which the coil held by the holder 21 has its leads in engagement with the connectors 17.

When the core 42 is pulled downwardly by the solenoid 41, the turntable may be moved by the rack 33 and the pinion 32, and whenever the solenoid 41 is energized, the core 42 actuates a limit switch contact 51 to move it out of engagement with a contact 52 and into engagement with a contact 53 (Fig. 4). Also, when the turntable is in its clockwise position in which the coil 13 is connected to the connector 16, the turntable actuates a limit switch 69 to move a contact 66 out of engagement with a contact 67 and into engagement with a contact 68, and when a coil is placed in the holder 22 it moves a contactor 62 of a limit switch 63 out of engagement with a contact 64 and into engagement with a contact 65.

When the turntable 14 is in its alternate or counterclockwise position in which the coil held by the holder 22 is in its testing position, the turntable actuates a limit switch 55 to move the contact 56 thereof out of engagement with the contact 57 and into engagement with the contact 58, and, at this time, when a coil is placed in the holder 21 it actuates a limit switch 72 to move a contact 73 thereof out of engagement with the contact 74 and into engagement with the contact 75. The limit switches 63 and 72 are only actuated by the coils for the immediate times that the holder 22 is in its loading position and the holder 21 is in its loading position, respectively.

Assuming the turntable to be in its furthermost clockwise position and the operator has placed a coil in the holder 22 to move the contact 62 of the switch 63 into engagement with the contact 65, the operator presses a manually operable, momentary switch 81 to move contacts 82 and 83 out of engagement with a contact 84 and into engagement with the contact 85, respectively. When the contacts 82 and 84 break, a relay winding 88, having been energized by conductors 89 and 90 from A. C. power line 91, is deenergized to open contacts 94 to drop out a relay 95, which had been energized by a positive conductor 96 and a negative conductor 97 of a D. C. power line 98, the relay 95 dropping out to open contacts 99 and 100 thereof. When the contacts 83 and 85 of the switch 81 make, a relay 101 is energized to open contacts 102 and close contacts 103, 104, 105 and 106.

The relay 101 locks in through the contacts 106 and normally closed contacts 111 of a relay 112. The closing of the contacts 105 energizes a relay 113, which closes holding contacts 114 to lock itself in, moves a contact 115 out of engagement with a contact 116 to break the initial energizing circuit to the relay 101, and moves the contact 115 into engagement with a contact 117 to set up an energizing circuit to relay 118, which is actuated later when the relay 101 is dropped out and closes the contacts 102. Closing of the contacts 103 energizes the release solenoid winding 41 through the contacts 56 and 58 and the core 42 releases the turntable 14, moves the contact 51 out of engagement with the contact 52 and moves the contact 51 into engagement with the contact 53. The switch 81 is released, and the solenoid winding 35 is energized by the closed contacts 51 and 53 through the contacts 82 and 84 of the switch 81, the contacts 51 and 53 and the contacts 104 of the relay 101. The solenoid core 34 then swings the turntable 14 in a counterclockwise direction, as viewed in Fig. 1. As the turntable so swings, the limit switch 69 is released, the contact 66 moves out of engagement with the contact 68 and into engagement with the contact 67 to keep the release solenoid 41 still energized. Then at the end of the counterclockwise travel of the turntable, which moves the coil leads of the coil 13 held by the holder 22 into engagement with the spring-pressed connectors 15 and the holder 21 to the loading and unloading position, the limit switch 55 is actuated by the turntable to move the contact 56 out of engagement with the contact 57 to deenergize the release solenoid winding 41 and into engagement with the contact 58 to set up the circuit to the winding 41 for energization later when contacts 131 of the relay 118 are closed.

The deenergization of the solenoid winding 41 permits the contact 51 to move from the contact 53 to drop out the solenoid winding 35 and into engagement with the contact 52 to reenergize the relay 88 to close the contacts 94 to energize the relay 95. The relay 95 closes the contacts 99 and 100 to actuate a relay 135 through contacts 99, 64, 62, 74 and 73, the holder 21 having no coil in it at this time so that the limit switch is in its normal position, and actuate the relay 112 through contacts 100 and 136. The relay 135 closes holding contacts 137 to lock itself in, closes contacts 138 and moves a contact 139 from a contact 140 to a contact 141 to bring in a delaying capacitor 142 from a shorted position. The relay 112 opens contacts 111 to drop out the relay 101 to set up an energizing circuit to the relay 118, closes contacts 151 and 152 to energize relays 153 and 154, respectively, the relay 154 having a resistor 155 therein to cause it to be energized slower than the relay 153, opens contacts 156 and closes contacts 157 and 158.

The energization of the relay 154 closes contacts 171, 172, 173, 174, 175 and 176. The contacts 171 and 172 hold in the relays 153 and 112, the contacts 173 energize a slow-to-operate relay 181, the contacts 174 set up an energizing circuit to a relay 182, and the contacts 175 connect a positive conductor 183 of a powerline 184 having also a negative conductor 185 through a resistor 186 to plate resistors 188 and 189 of a multivibrator 190. A resistance-capacitance network 187 connects the resistors 188 and 189 to a conductor 191 connected to the negative conductor 185. The contacts 175 also connect plates 201, 202, 203 and 207 of tubes 204, 205, 206 and 288 to the positive conductor 183. The contacts 176, normally closed contacts 211 and a voltage divider 213 connect screen grids 214 of tubes 215 to the positive conductor 183.

When the relay 112 was energized, it opened the contacts 156 to a relay 221, which has contacts 222 and 223 out of engagement with contacts 225 and 226 and engaging contacts 227 and 228 and contacts 229 and 230 out of engagement with contacts 231 and 232. The relay 221 holds the coil 13 from a bridge circuit 235 and disconnects a sensitive meter relay 236 of a well known type from the bridge circuit. The contacts 227 and 228 connect the ends of the coil to contacts 241 and 242 of the relay 153, which having been actuated, has the contacts 241 and 242 closed to connect one coil end to the powerline conductor 183 through a resistor 238 and the other coil end to plates 243 of the tubes 215, a voltage dividing network 282 and a capacitor 244 to a spark detector circuit 312.

When the relay 181 is energized by contacts 173, it operates slowly, moves a contact 251 from a contact 252 to a contact 253 to discharge a condenser 254, closes holding contacts 255, opens contacts 256 to set up the relay 153 for deenergization, opens contacts 257 to deenergize a contact-locking solenoid 258 of a sensitive meter relay 259 of a well known type, and closes contacts 260 to connect a resistor 261 and a slow-to-operate relay 262 to the negative powerline conductor 97.

The multivibrator 190 sends positive square wave pulses occurring about every tenth of a second to control grids 281 to the tubes 215, which cuts off the tubes 215 on the negative halves of the pulses to stop current through the coil 13. Then, each time the multivibrator alternately sends a negative pulse to the control grids 281, the tubes 215 are made non-conductive and the delaying current in the coil induces a sharp, high voltage pulse of short duration which is sent to the top of the voltage divider 282 and a proportional voltage is transmitted from the divider 282 to plates 283 of diodes 284 and to a control grid 285 of the tube 204. Tubes 204, 286, 287 and 288 form a pulse-stretching circuit 289, which stretches the pulse from the relay and sends stretched voltage pulses proportional in voltage to the voltage of the pulses from the coil 13 to a vacuum tube voltmeter circuit 291 to create a difference of potential between cathodes 292 and 293 proportional to the voltage of the pulses from the coil 13.

If the pulses of the coil are sufficiently high, a coil 295 of the sensitive relay 259 moves a contact 296 into engagement with a contact 297 to light an indicating lamp 298 and actuate a relay 299. The relay 299 closes holding contacts 300 and moves a contact 301 from a contact 302 to a contact 303 to energize the relay 221. The relay 221 switches the coil 13 to the bridge circuit 235, and, if the coil has sufficient resistance, current flows through a coil 306 of the sensitive, meter type relay 236 in a direction swinging a contact 307 to a contact 308. This energizes a relay 309 to close contacts 310 to reverse the turntable 14.

If there is a short of a sparking type in the coil 13 at the time it is pulsed by the multivibrator 190, a tuned circuit 311 reacts to the sparking to actuate the spark detector circuit 312, which transmits sufficient voltage to a gas filled tube 313 to fire the tube 313 and actuate a relay 314. The relay 314 closes contacts 315 to energize the relay 182 to close holding contacts 316 to light an indicating lamp 317, open contacts 318 to an indicating lamp 319, open contacts 320 to the lamp 298 and open contacts 321 to the relay 221 to prevent energization thereof, which stops further tests and automatic movement of the turntable 14.

When the relay 181 closes the contacts 260, the slow-to-pick-up relay 262 is started to be energized, and, if the coil does not pass to bring in the relay 299, is energized to open contacts 136 of one circuit to the relay 112, opens contacts 331 to drop out the relay 154, which then drops out the relay 112, closes holding contacts 332, moves a contact 333 from a contact 334 to a contact 335 to discharge a delaying capacitor 336, closes contacts 337 to a failure-indicating lamp 338, opens contacts 339 to open one circuit to the relay 182, and opens contacts 211 to prevent further pulsing of the coil 13. The relay 153 is dropped out by the dropping out of the relay 112.

When the contacts 310 are closed by the coil 13 passing both tests, assuming the operator has placed a coil in the holder 21 to close the contacts 73 and 75, the relay 118 is energized through the contacts 102, 115, 117, 138, 310, 75 and 73, the relay 101 having been dropped out when the relay 112 first operated. The relay 118 closes contacts 131 to energize the release solenoid winding 42 through the contacts 58 and 56, closes contacts 351 to energize the solenoid winding 37 through the contacts 53, 51, 84 and 82, opens contacts 352 to drop out the relay 113, opens contacts 353 to block out the relay 101 and closes holding contacts 354 thereof. The energization of the release solenoid winding 41 to open contacts 51 and 52 drops out the relay 88, which in turn drops out the relay 95. The deenergization of the relay 95 drops out the relay 135 by opening the contacts 99, and the contacts 100 drop out all relays locked up by the test of the previous coil, such as, the relays 182 for example. The turntable swings clockwise to release the switch 55, which returns to its normal position in which the contact 56 engages only the contact 57 and not the contact 58. As the table 14 is so moved, the coil 13 in the holder 21 is moved away from the switch 72 to release it to cause engagement between the contacts 73 and 74 to set up the circuit to the relay 135, the coil held by the holder 21 breaks contact with the connectors 15 to drop out the relay 309. As the turntable moves to its furthermost clockwise position, it moves the contact 66 of the limit switch 69 from the contact 67 to deenergize the release solenoid 42, and move the contact 66 to engagement with the contact 68 to set up the release solenoid 41 for actuation by the relay 101 at the end of the testing of the newly contacted coil. The deenergizaion of the release solenoid winding 41 releases the contact 51, which moves back into engagement with the contact 52 to energize the relay 88. The relay 88 closes contacts 94 to energize the relay 95, which energizes the relay 135, and the tests are applied automatically to the coil held by the holder 21.

As the coil 13 just tested is moved to the loading and unloading position it is removed from the holder 22, and a new coil 13 is placed in the holder 22, the new coil actuates the limit switch 63 to move the contact 62 from the contact 64 to the contact 65 to set up dropping out the relay 135 at the end of the tests on the coil held by the holder 21. If the coil held by the holder 21 successfully passes all the tests, the relay 309 closes the contacts 310, and, the relay 118 having been dropped out by the initial energization of the relay 112 at the start of the tests, the relay 101 is energized through the contacts 353, 116, 115, 138, 310, 65, 62, 74 and 73. The contacts 103 actuate the release solenoid 41, the contacts 104 actuate the solenoid 35, the contacts 105 energize the relay 113 which will cause the relay 118 to be brought in and the relay 101 to be inactive on the test of the next succeeding article to be tested, the contacts 106 lock in the relay 101, and the contacts 102 block energization of the relay 118 as the relay 113 pulls up. The turntable swings and the tests are applied to the coil held by the holder 22 in the same manner as described hereinabove. The relay 88 is energized through the contacts 51 and 52 to energize the relay 95.

It will be noted that the relay 113 effects mutually exclusive operation of the relays 101 and 118 so that the relays 101 and 118 operate on alternate tests to effect reversing of the turntable on successful completion of the tests. Whenever the turntable 14 fails to reverse its position because of a failure of the coil under test, the switch 81 must be actuated to reverse it, thereby indicating to the operator that the coil failed.

The above-described apparatus serves to test coils as quickly as they may be unloaded and loaded into the apparatus by an operator, and positively indicates the failure of any coil to pass any of the three tests. The apparatus may be obviously modified to effect a series of greater than three tests in sequence, and also may test a plurality of windings of a coil.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. A testing apparatus, which comprises a testing station, a second testing station spaced from the first testing station, a first article-holder, a second article-holder, a support carrying the holders in spaced positions thereon and movable between a position locating the first article-holder at the first testing station and a second position locating the second article-holder at the second testing station, reversible means for moving the support between said positions, testing means at the first station responsive to a satisfactory article for actuating the support-moving means, and testing means at the second station responsive to a satisfactory article for actuating the support-moving means.

2. A testing apparatus, which comprises an oscillatory turntable sector movable through a predetermined path, first article-contacting means positioned at one end of the path of movement of the sector, second article-contacting means positioned at the other end of the path of movement of the sector, first article-holding means on the sector for moving an article into engagement with the first article-contacting means, second article-holding means on the sector for moving an article into engagement with the second article-contacting means, testing means coupled with the first article-contacting means and the second article-contacting means in parallel for automatically performing a series of tests on an article moved into engagement with either of said article-contacting means, and means operable by the testing means after an article has passed the tests applied thereto for shifting the sector from the operating article-contacting means to the other article-contacting means.

3. A testing apparatus, which comprises an oscillatory shaft, a turntable sector keyed to the shaft and movable thereby through a predetermined path, a pinion keyed to the shaft, a rack meshing with the pinion, first article-testing means positioned at one end of the path of movement of the sector, second article-testing means positioned at the other end of the path of movement of the sector, first article-holding means on the sector for moving an article to the article-testing means, second article-testing means on the sector for moving an article into engagement with the second article-testing means, a solenoid operable by the first testing means for pulling the rack in a direction such that the sector swings that article away from the first testing means and a second article to the second testing means, and a second solenoid operable by the second article-testing means for pulling the rack in the opposite direction.

4. A testing apparatus, which comprises a support reciprocable through a predetermined path, first solenoid means for moving the support to one end of the path, second solenoid means for moving the support to the other end of the path, first article-contacting means positioned at the first-mentioned end of the path of movement of the sector, second article-contacting means positioned at the second-mentioned end of the path of movement of the sector, first article-holding means on the sector for moving an article to the first article-contacting means, second article-holding means on the sector for moving an article to the second article-contacting means, testing means coupled with the first article-contacting means and the second article-contacting means in parallel for automatically performing a test on an article moved into engagement with either of said article-contacting means, means operable by the testing means after an article at the first article-contacting means has passed the test applied thereto for actuating the second solenoid means, and means operable by the testing means after an article at the second article-contacting means has passed the test applied thereto for actuating the first solenoid means.

5. A testing apparatus, which comprises an oscillatory turntable sector movable through a predetermined path, first article-testing means positioned at one end of the path of movement of the sector, second article-testing means positioned at the other end of the path of movement of the sector, first article-holding means on the sector for moving an article from a loading position intermediate the article-testing means to a testing position at the first article-testing means, second article-holding means on the sector for moving an article from a loading position intermediate the article-testing means to a testing position at the second article-testing means, and means operable by the article-testing means for shifting the sector.

6. A testing apparatus, which comprises an oscillatory turntable sector movable through a predetermined path, first coil-testing means positioned at one end of the path of movement of the sector, second coil-testing means positioned at the other end of the path of movement of the sector, first coil-holding means on the sector for moving a coil from a loading position intermediate the coil-testing means to a testing position at the first coil-testing means, second coil-holding means on the sector for moving a coil from a loading position intermediate the coil-testing means to a testing position at the second coil-testing means, first solenoid means for moving the sector to a position in which a coil is held by the second coil-holding means in its testing position, stop means operable by the sector when holding the last-mentioned coil in its testing position for deenergizing the first solenoid means, second solenoid means for moving the sector to a position in which a coil is held by the first coil-holding means in its testing position, stop means operable by the sector when holding the last-mentioned coil in its testing position for deenergizing the second solenoid means, means responsive to the first coil-testing means for actuating the second solenoid means, and means responsive to the second coil-testing means for actuating the first solenoid means.

7. A testing apparatus, which comprises a support movable back and forth along a predetermined path, first article-testing means positioned at one end of the path of movement of the support, second article-testing means positioned at the other end of the path of movement of the support, first article-holding means on the support for moving an article from a loading position intermediate the article-testing means to a testing position at the first article-testing means, second article-holding means on the support for moving an article from a loading position intermediate the article-testing means to a testing position at the second article-testing means, means operable by the first article-testing means for shifting the support to move an article held by the second article-holding means to the second article-testing means, and means operable by the second article-testing means for shifting the support to move an article held by the first article-holding means to the first article testing means.

8. A testing apparatus, which comprises an oscillatory turntable sector movable through a predetermined path, first coil-contacting means positioned at one end of the path of movement of the sector including a plurality of spring-pressed contactors adapted to be engaged by rigid leads of a coil, second coil-contacting means positioned at the other end of the path of movement of the sector including a plurality of spring-pressed contactors adapted to be engaged by the leads of a coil, first coil-holding means on the sector for moving a coil into engagement with the first coil-contacting means, second coil-holding means on the sector for moving a coil into engagement with the second coil-contacting means, testing means coupled with the first coil-contacting means and the second coil-contacting means in parallel for automatically performing a series of tests on a coil moved into engagement with either of said coil-contacting means, and means operable by the testing means after a coil has passed the tests applied thereto for shifting the sector from the operating coil-contacting means to the other coil-contacting means.

9. A testing apparatus, which comprises a support movable back and forth through a predetermined path, first coil-contacting means positioned at one end of the path of movement of the support including a plurality of contactors adapted to be engaged by leads of a coil, second coil-contacting means positioned at the other end of the path of movement of the sector including a plurality of contactors adapted to be engaged by the leads of a coil, first coil-holding means on the support for moving a coil into engagement with the first coil-contacting means, second coil-holding means on the support for moving a coil into engagement with the second coil-contacting means, testing means coupled with the first coil-contacting means and the second coil-contacting means in parallel for automatically performing a test on a coil moved into engagement with either of said coil-contacting means, and means operable by the testing means after a coil has passed the test applied thereto for shifting the support from the operating coil-contacting means to the other coil-contacting means.

10. A testing apparatus, which comprises a reciprocable support movable through a predetermined path, first coil-contacting means positioned at one end of the path of movement of the support including a plurality of spring-pressed contactors adapted to be engaged by rigid leads of a coil, second coil-contacting means positioned at the other end of the path of movement of the support including a plurality of spring-pressed contactors adapted to be engaged by the leads of a coil, first coil-holding means on the support for moving a coil into engagement with the first coil-contacting means, second coil-holding means on the support for moving a coil into engagement with the second coil-contacting means, testing means coupled with the first coil-contacting means and the second coil-contacting means in parallel for automatically performing a series of tests on a coil moved into engagement with either of said coil-contacting means, and means operable by the testing means after a coil has passed the tests applied thereto for shifting the support from the operating coil-contacting means to the other coil-contacting means, means for blocking the shifting means, means operable by a coil in the first coil-holding means for rendering the blocking means ineffctive when the support is in a position in which a coil held by the second coil-holding means is in engagement with the second coil-contacting means, and means operable by a coil in the second coil-holding means for rendering the blocking means ineffective when the support is in a position in which a coil held by the first coil-holding means is in engagement with the coil-contacting means.

References Cited in the file of this patent

UNITED STATES PATENTS

| | | |
|---|---|---|
| 1,428,632 | Hendrickson | Sept. 12, 1922 |
| 2,201,562 | Paulson | May 21, 1940 |
| 2,362,774 | Romanoff | Nov. 14, 1944 |